May 15, 1945.  H. R. GROSS  2,375,917
ELECTRIC CABLE REEL
Filed Oct. 11, 1943  2 Sheets-Sheet 1
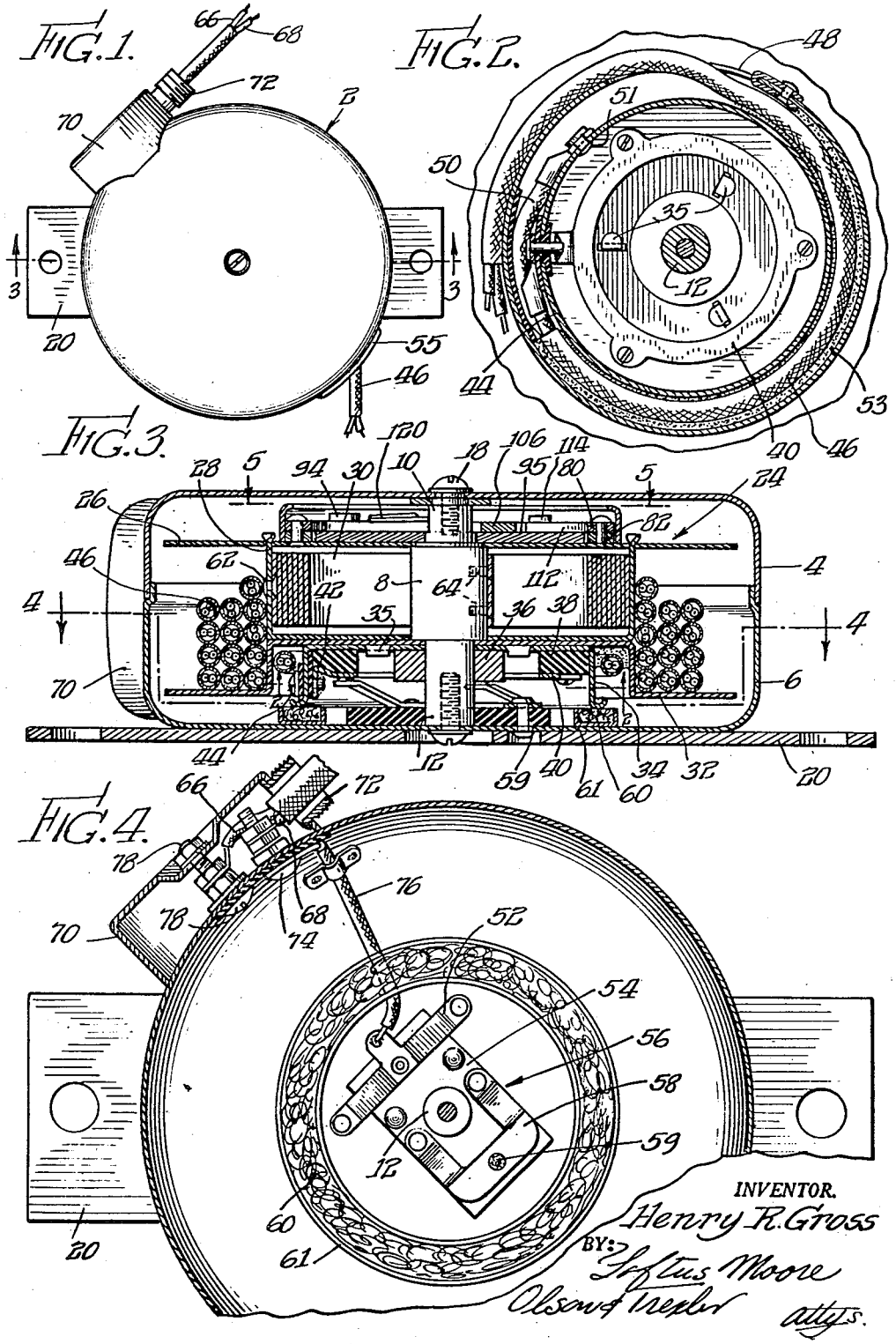
INVENTOR.
Henry R. Gross
BY
Loftus Moore
Olson & Trexler
attys.

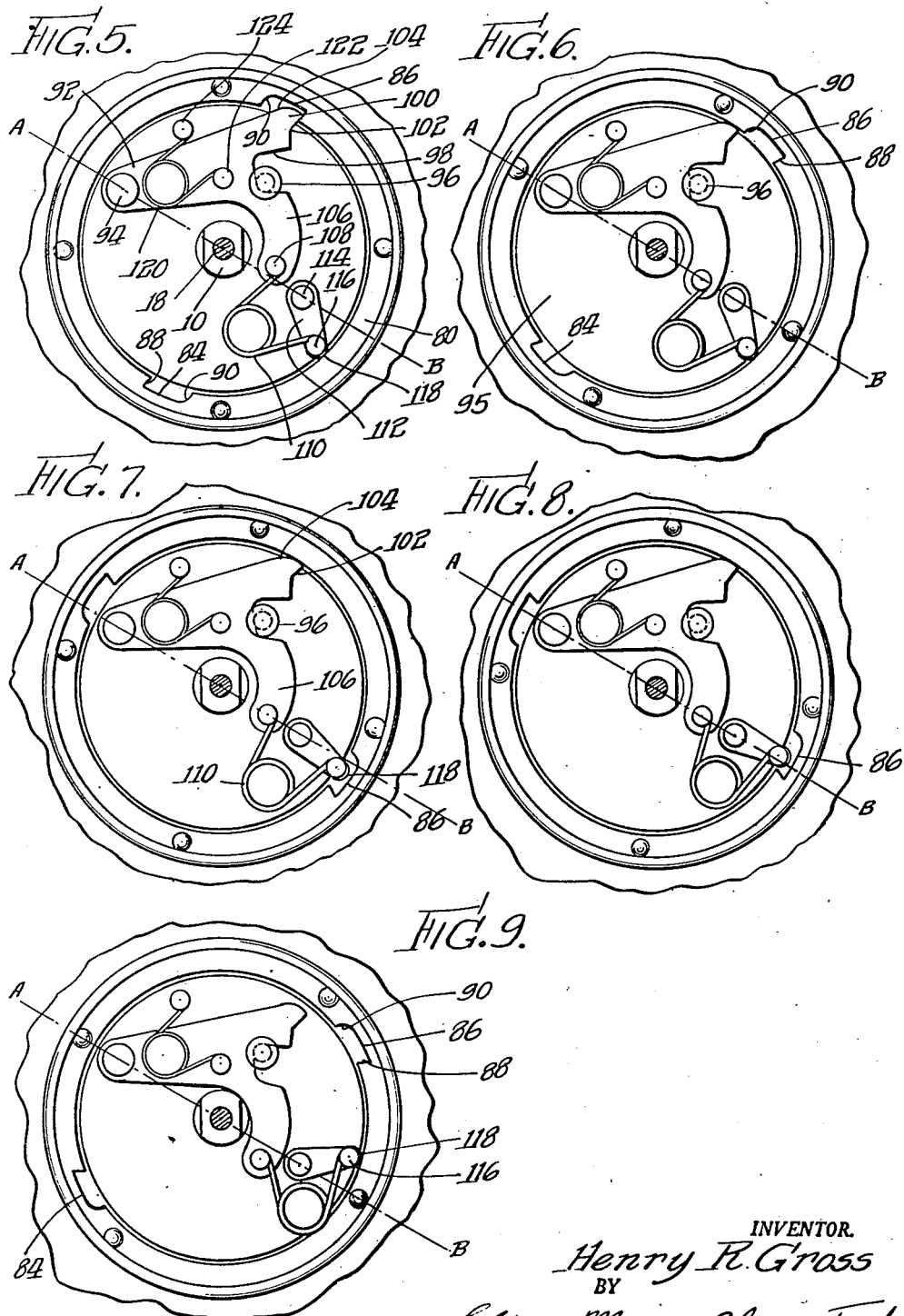

Patented May 15, 1945

2,375,917

UNITED STATES PATENT OFFICE 2,375,917

ELECTRIC CABLE REEL

Henry R. Gross, Chicago, Ill.

Application October 11, 1943, Serial No. 505,779

14 Claims. (Cl. 242—107)

This invention relates to an electric cable reel permitting the cable to be unwound to the extent desired, and automatically rewinding or retracting the cable in response to a pull on the cable itself.

This application is a continuation in part of my application, Serial Number 480,757, filed March 27, 1943, now abandoned.

The principal object of the invention is to provide such a reel which may be mounted horizontally or in any angular position whatsoever.

It is a further object of the invention to provide an electric cable reel wherein the means for latching the reel against rewinding is positively actuated to, and positively held in, releasing position to permit rewinding of the cable in whatever angular, or horizontal, position the reel may be mounted.

A further object of the invention is to provide in an electric cable reel having ratchet and pawl means permitting extension of the cable and latching the reel against cable retraction, automatically operated means operable upon a pull on the cable to render the pawl and ratchet means ineffective to prevent cable retraction and operable upon a pull on the cable for rendering the pawl and ratchet means effective to prevent cable retraction.

It is a further object of the invention to provide in an electrical cable reel, of the character above described, means for preventing the engagement of the pawl and ratchet means, should the automatically operated means, by reason of wear or breakage, be rendered inoperative to hold the pawl and ratchet means in ineffective position so that, in such an eventuality, the reel may be continued in use by manually holding the cable in extended position.

Other and further objects and advantages of the invention will be apparent from the following description when taken in connection with the accompanying drawings, wherein—

Figure 1 is a plan view of a horizontally mounted electric cable reel embodying the invention;

Figure 2 is a view in section on line 2—2 of Figure 3;

Figure 3 is an enlarged view in vertical section taken substantially along the line 3—3 of Figure 1;

Figure 4 is a fragmentary view in horizontal section taken substantially along the line 4—4 of Figure 3;

Figure 5 is a fragmentary view in horizontal section taken substantially along the line 5—5 of Figure 3;

Figures 6 to 9 are views similar to Figure 5 but showing the mechanism in different positions of operation.

As shown in the drawings, a preferred embodiment of the invention comprises a drum or casing 2 formed of interfitting sheet metal shells 4 and 6. The casing forms a housing for a shaft 8 having reduced and centrally threaded opposite end portions 10 and 12, the reduced end portion 12 receiving in its threaded opening a screw which fastens the shell 6 to the shaft 8. The threaded opening in the reduced end portion 10 receives a screw 18 fastening the shell 4 to the shaft. The shell 6 is spot welded or otherwise fastened to a mounting bar or bracket 20.

A reel or drum 24 is housed in the casing 2 and comprises a disk or plate 26 fastened in any appropriate manner to a shell 28 which forms a housing for the reel rewinding and cable retracting spring 30. The shell 28 may be secured by riveting or in any other convenient manner to a centrally offset plate or disk 32, the annular flange of which forms, with the portion of the plate 26 beyond the shell 28, means for confining the cable upon a drum formed by the shell 28 and the centrally offset portion of the plate 32. The centrally offset portion of the plate 32 forms a housing for the collector means, or rings and brushes, by means of which the inner ends of the wire of the electric cable are connected to the supply leads. Thus there may be mounted on the centrally offset portion of the plate 32 a cup-shaped member 34, fixed by lugs 35 to the plate 32, and to this cup-shaped member there is affixed, centrally, a metal ring 36. A ring 38 of insulating material is also mounted in and fastened to the cup-shaped metal member 34, and this ring carries a slip ring 40 having a lug 42, to which is soldered the end of one wire 44 of the extensible electric cable 46. The cable 46 extends into the centrally offset portion of the reel plate 32 through opening 48, and the wire 44 extends into the cup-shaped metal member 34 for connection to the lug 42 through suitable insulating spacers surrounding an opening in the annular flange of this member. The other wire 50 of the extensible cable is connected to a grommet 51 fastened to the cup-shaped member 34, by means of which electrical connection is established to the ring 36. The cable 46 extends around a considerable portion of the member 34 and is secured by a suitable cementing layer 53 to the inner surface of the centrally depressed portion of the plate 32. The cable 46 extends from the casing through a ring 55 in suitable notches in the meeting edges of the shells 4 and 6, the ring 55 aiding in holding the shell 4 against rotation.

A brush 52 engages the slip ring 40 and this brush may comprise a resilient metal strip fastened to an insulating member 54, fastened as by appropriate rivets to the shell 6 of the casing. A brush 56 cooperates with the ring 36, and this brush may comprise a spring metal V-shaped member 58 having integrally formed resilient prongs engaging the ring 36. The member 58 is mounted on the member 54 and connected to the shell 6 by rivet 59.

A greased seal ring 60 of felt or other suitable material is contained in a cup 61 welded to the shell 6 and is positioned to contact the rounded, rebent edge of the annular flange of the cup 34 to complete the enclosing housing for the collector means, or rings and brushes, to protect these elements from dirt, dust, moisture, etc.

The spirally wound driving spring 30 is secured at one end to the shell 28, as by rivet 62 received in a slot in the annular flange of the shell 28, and at the other end to the stationary shaft 8, as by screws 64. The supply leads 66 and 68 pass into a fitting 70. This may comprise a sheet metal shell or housing shaped to the configuration of the casing 2 and soldered or otherwise fastened to that casing in the position shown in Figure 1 or in the reverse position in which the pipe nipple 72 extends in the opposite direction; the pipe nipple 72 connecting the fitting 70 to the usual wiring conduit (not shown). The active or "hot" wire of the lead-ins, as for example the lead-in 68, is connected to the terminal screw 74 mounted on, but insulated from, the rim of the shell 6, and this terminal screw is connected by the insulated wire 76 extending along the bottom of the shell and into the housng formed by sealing ring 60 and cup 34 where it is connected to the brush 52. The grounded one of the lead-ins, as for example the lead-in 66, is connected to the shell 6 as by terminal screw 78. The shell 4 is notched to encompass the screw 78, which thus aids in holding the shell 4 against rotation relative to shell 6.

A pair of metal rings 80 and 82 (Figure 3) are spotwelded, riveted, or otherwise fastened to each other and to the outer surface of the disc or plate 26 of the reel drum 24. The rings 80 and 82 are provided with two or more angularly spaced notches 84 and 86 (Figures 5 to 9), each formed to have an abrupt or radial shoulder 88 at its "forward" edge and a curved camlike shoulder 90 at its "rear" edge. A detent, pawl or latching member 92 is pivoted as by pin or rivet 94 to a disc or plate 95. The end portion 10 of shaft 8 is formed as a key for the plate 95 to hold it against rotation. The pawl 92 is guided and limited in its movement by headed pin or rivet 96 fixed to the plate 95 and received in a slot 98 in the member 92, the head of the pin 96 overlying the edge of the slot 98. The member 92 is provided with a tooth or latching projection 100 adapted to be received in the notches 84 and 86 and formed with an abrupt or radial "forward" surface 102 for engaging the shoulder 88 of each notch and formed with a curved or camlike "rear" surface 104 cooperating with the shoulder 90 of each notch to effect inward movement of the member 92 as the rings 80 and 82 rotate in a clockwise direction, as seen in Figures 5 through 9.

The member 92 is formed with an integral arm 106 carrying adjacent its free end a pin 108 receiving the hook end of a spiral spring 110. Preferably the pin 108 is formed with an annular groove which receives that end of the spring so that the end of the spring may be swung relative to the pin but is held against movement longitudinally of the pin. A lever, pawl, or release member 112 is pivoted as by pin or rivet 114 to the outer surface of the plate 95. The pivot pin 114 is positioned with its axis on the same diameter AB of the disk or plate 95 as the axis of the pin 94.

The lever 112 is provided with a pin 116 similar to the pin 108 and receiving in a similar manner the opposite hook end of the spring 110, and the forward free end or nose of the lever is curved to provide a camlike surface 118 which will engage the inner edge of the ring 80 but will not retard the rotation of the ring. The lever 112 is greater in length than the distance between the axis of its pivot pin 114 and the inner edge of the ring 89 measured along the diameter AB, but is somewhat less in length than the distance from the axis of the pivot pin 114 to the base of the notch 84 or 86 measured along this same diameter.

The pin 108 carried by the arm 106 of the member 92 is so mounted that, when the member 92 is in the position showin in Figure 6 with its tooth 100 contacting the inner surface of the ring 89, spring 110 applies a force tending to rotate the member 92 and the lever 112 in a counterclockwise direction.

When a pull is exerted on the electric cable 46 to extend or withdraw it from the reel, the reel drum 24 and consequently the ring 80 is rotated in a clockwise direction, as seen in Figures 5 through 9, and if the latching member 92 and release member 112 be in the position shown in Figure 5, the rear edge of each notch engaging the rear surface of the tooth 100 of the latch member moves the latter inwardly to the position shown in Figure 6 as the ring 80 rotates. The spring 110 maintains the tooth 100 in light contacting engagement with the inner surface of the ring, and also maintains cam surface 118 of the lever 112 in light contacting engagement with that surface. Hence, as the next notch— for example notch 84—comes in line with the tooth 100 of the latch member, the spring 110 moves the member outwardly and the tooth into the notch, by the rear edge of which the members are again moved inwardly while the rotation of the reel drum is continued.

It will be evident that when the cable has been extended the desired amount and the cable released, the returning or rewinding spring 30 causes the reel drum to rotate in a counterclockwise direction until notch 84 or 86, whichever was positioned between the tooth 100 and the lever 112 at the time the pull on the cable was released, aligns with the tooth 100 and the forward shoulder 88 of the notch is engaged by the forward surface 102 of the tooth by which the ring, and consequently the reel drum, are held against further backward or retractile movement, the member 92 and the lever 112 then occupying the position shown in Figure 5.

When it is desired to shorten or retract the cable, a pull is first exerted on the cable which causes the reel drum and ring 80 to rotate in clockwise direction, and this pull is continued until the notch, in which the tooth 100 was last received, passes the lever 112 and the cable is then released, permitting the spring to rotate the reel drum and ring 80 in a counterclockwise direction. As the ring, in rotating in the counterclockwise direction, causes that notch to become aligned with the lever or release member 112, the spring 110 rotates this member in a counterclockwise direction to the position shown in Figure 7. When the lever 112 is in the position shown in Figures 7 and 8, the spring 110 is in an unstressed condition and is, therefore, not attempting to rotate the lever 112 or the pawl 92 in either direction. As the ring continues to rotate, the shoulder 88 of the notch engages the lever and swings the pin 116 past line A—B so that the spring 110, as the lever passes the position shown in Figure 8, snaps the member 92 into the position shown in Figure 9, in which position the pin 108 is spaced from the diameter or line AB in a clockwise direction and the member 92 is held out of contacting engagement with the inner surface of the ring, and retained against movement into the notches as the reel drum and ring continue to rotate in a counterclockwise direction to effect rewinding or retraction of the electric cable.

It will be evident that when the member 92 and member 112 are positioned as shown in Figure 9, the spring 110 urges the lever 112 in clockwise direction and retains it in light contacting engagement with the inner surface of the ring 80, so that whenever by a pull exerted on the cable, the reel and drum are rotated in a clockwise direction, the lever will be urged into the first notch to become aligned with it and will thereupon be moved by the shoulder 90 of the notch in a clockwise direction until the center of the pin 116 passes the line through the centers of the pin 108 and the pivot pin 114 and the member 92 thereby returned to the position shown in Figure 6, so that the tooth 100 and the member 92 will be positioned for movement into the notch in the ring whenever, following a release of the pull on the cable, the reel drum moves backwardly sufficiently to align a notch with the tooth.

Since the angular spacing of the nose of the lever 112 from the tooth 100 is approximately one-third of the circumference of the ring, there is one out of three chances of the reel being released for retraction of the cable by reelase of the pull on the cable, and two out of three chances of its being locked against retraction upon release of the pull on the cable. This is advantageous for the possibility of an inadvertent retraction of the cable upon sudden release of the pull on the cable is minimized.

It will be evident that this ratio may be varied by varying the number of notches in the ring 80 to increase or decrease the possibilities of locking or releasing the reel drum for cable retraction upon any given angular movement of the drum.

The headed pin 96 not only serves as a guide for maintaining the movements of the member 92 properly parallel to the plate 95, but also serves, by limiting movement of the member, to assure maintenance of the spring 110 under the proper tension required for the proper automatic operation of the member 92 and lever 112.

Under the conditions of rough usage to which the reel may be subjected, for example, as when mounted in a tank, the spiral spring 110 may, by wear or breakage, become ineffective to hold the pawl 92 in the releasing position shown in Figure 9. If the reel were mounted in a vertical position, or in a position inclined at a sufficient angle to the vertical, the pawl 92 may, then, by the action of gravity, be moved into a notch 84 or 86 when the tooth becomes aligned with the tooth 100 of the other pawl. The tooth of the pawl will then, by the action of gravity, become seated in the notch and further re-winding of the cable on the reel will thereafter be prevented.

In order to eliminate this possibility, a light spiral spring 120 has one end hooked over a pin 122 carried by the pawl 92 and its other end hooked over a pin 124 secured to the disk 95 between the pawl and the outer edge of the disk. This spring constantly urges the pawl in a clockwise direction with a force which is materially less than the force applied to the pawl by the spring 110. The spring 120, however, applies sufficient force to the pawl to overcome the action of gravity should the reel be mounted in a vertical position or in any position in which the force of gravity would tend to cause the pawl to move in a counterclockwise direction and engage in one of the notches of the ring 80. It is also of sufficient force to prevent the pawl from moving into engagement with the notch under the strongest vibrations to which the reel might be subjected. It will be evident, therefore, that should the spring 110, by wear or breakage, be rendered ineffective to hold the pawl out of engagement with the ratchet when the member 112 is in the released position, as in Figure 9, the spring 120 will come into play and hold the pawl permanently in released position so that the reel may be continued in use and, while not locked when the cable is in extended position, nevertheless automatically retractable to rewind the cable when the pawl or holding force on the cable is released.

In order to prevent latching of the reel against retraction of the cable when the cable is fully extended, a predetermined length of the cable is cemented or otherwise fastened, interiorly of the center of the offset portion of the plate 32 of the reel drum, to that plate, so that when the cable is fully extended a notch will not be aligned with a tooth of the member 92, but a sufficient length of cable will be retained on the drum when the drum is latched so that a pull on the cable will further extend the same, and then, by releasing the cable, the lever 112 will be operated to move the member 92 into this released position, permitting automatic retraction of the cable. Alternatively, if the conditions of service are such that a fully sealed upper casing surface is not required, the member 92 may be provided with a pin extending axially of the reel drum through an opening provided in the shell 4 so that such pin can be manipulated to manually release the latch member 92 if the same should be aligned with a notch when the cable is fully extended.

It will be evident that by the disclosed invention applicant has provided an electric cable reel which may be mounted in a horizontal, vertical, or any inclined position, without interfering with the proper operation of the reel releasing and retraction preventing mechanism.

It is thought that the invention and numerous of its attendant advantages will be understood from the foregoing illustrative description, and it is obvious that numerous changes may be made in the form, construction, and arrangement of the several parts without departing from the spirit or scope of the invention or sacrificing any of its attendant advantages, the form herein described being a preferred embodiment for the purpose of illustrating the invention.

What I claim is:

1. In an electric cable reel, means adapted to rotate about a vertical axis for yielding and automatically retracting the cable, pawl and ratchet members adapted to be horizontally mounted, said members being relatively movable upon yielding of the cable and latching said cable against retraction, and separate means actuated by one of said members for control by the cable and connected to the other of said members for rendering said pawl and ratchet members ineffective to prevent retraction of the cable.

2. In a reel, a ratchet member rotatable with the reel, a pawl positioned to engage said ratchet for limiting winding of the reel and permitting unwinding of the reel, and toggle means for adjusting said pawl for rendering it effective or ineffective to limit winding of the reel, said toggle means comprising an operating member, and a spring connector in one position of the operating member urging said pawl into engagement with the ratchet and in a second position of said operating member maintaining said pawl out of engagement with said ratchet, said operating member being positioned to be engaged and moved by said ratchet from said one position to said second position upon limited winding of the reel and being engaged and moved by said ratchet from said second position to said one position upon unwinding of the reel.

3. In a cable reel, a rotary drum receiving said cable, a stationary shaft on which said drum rotates, spring means operatively connected to said drum for permitting rotation of the drum to extend the cable upon exertion of a pull on the cable and tending automatically to retract the cable upon release of the pull on the cable, pawl and ratchet members, said ratchet member being connected to the drum for rotation therewith and the pawl member being operatively connected to the shaft to be held thereby against rotation with the drum, said pawl and ratchet members being constructed to permit rotation of the drum in the cable extending direction upon a pull being exerted thereon and limiting the movement of the drum in the cable retracting direction when the pull on the cable is released, and a control member for rendering said pawl ineffective to limit rotation of the drum in the cable retracting direction, said control member being operatively connected to the pawl and mounted in angularly spaced relation thereto for actuation by the ratchet member when engaged thereby on rotation of the drum in the cable retracting direction.

4. In an electric cable reel, an extensible electric cable, a rotary drum receiving said cable, a stationary shaft on which said drum rotates, spring means operatively connected to said drum for permiting rotation of the drum to extend the cable upon exertion of a pull on the cable and tending automatically to rotate the drum in the opposite direction upon release of the pull on the cable, pawl and ratchet members of which one member is connected to the drum for rotation therewith and the other of which is connected to the shaft to be held thereby against rotation with the drum, said pawl and ratcet members being constructed to permit rotation of the reel in the cable extending direction upon a pull being exerted thereon and limiting the movement of the drum in the cable retracting direction when the pull on the cable is released, a two-position control means movable from a first position to a second position by the member rotating with the drum as the cable on being extended is released for retraction and movable from the second position to the first position upon rotation of the drum in the cable extending direction, and means connecting said two-position control means to the non-rotatable one of said pawl and ratchet members for moving said member to a position in which it is ineffective to limit rotation of the drum in the cable retracting direction when the control means is moved to its second position, said connecting means being constructed to return the non-rotatable member to a position in which it is effective to limit rotation of the rotatable member and drum in the cable retracting direction when the two-position control means is moved to its first position.

5. In a cable reel, a casing, a shaft in said casing, mounting means for said casing and adapted to hold said casing and shaft against rotation, a drum in said casing and rotatably mounted on said shaft, a cable wound upon said drum, said casing having an opening therethrough through which the cable passes for extension and retraction, a spring housed in said drum and connected at one end to the drum and at the other end to said stationary shaft for permitting rotation of the drum in one direction upon the exertion of a pull upon the cable and tending to rotate the drum in the opposite direction upon release of the pull on the cable, a toothed ring secured to said drum for rotation therewith, a pawl, mounting means for said pawl and secured to said shaft to prevent rotation of the pawl with the drum, a two-position pawl adjusting member secured against rotation with said drum and positioned for operation by a tooth of said ring, and spring means connecting said pawl adjusting member to said pawl and constructed and arranged to urge said pawl and said pawl adjusting member toward tooth-engaging positions when said adjusting member is in one position and to urge said pawl away from tooth-engaging position and said adjusting member toward tooth-engaging position when said adjusting member is in the second position.

6. In a cable reel, a stationary shaft, a drum rotatable on said shaft, a cable wound upon said drum, means operatively connected to said drum and shaft for permitting rotation of the drum in a forward direction to extend the cable when a pull is exerted thereon and tending to rotate said drum in a rearward direction to retract the cable when the pull on the cable is released, a ring secured to said drum for rotation therewith, a plate mounted within said ring and secured to said shaft against rotation with the drum, a pawl pivoted on said plate, said ring having teeth for engagement by said pawl to prevent rotation of the drum in the rearward direction and ratcheting past said pawl on rotation of the drum in the forward direction, a lever pivoted to said plate, a toggle connection, including a spring, connecting said lever to said pawl, said spring being constructed and arranged to urge said pawl into position to engage the teeth of the ring when the lever is a first position and maintaining said pawl out of tooth-engaging position when the lever is in a second position, said lever being constructed and arranged for movement by the teeth of the ring from the first position to the second position and, reversely, in accordance with the direction of rotation of the drum.

7. In a reel, means permitting rotation of the reel in a forward direction and tending to urge said reel in a rearward direction, a ring secured to said reel, a pawl, mounting means on which said pawl is pivoted for preventing rotation of the pawl with the reel, said ring having notches therein, each having an abrupt forward edge engageable with the pawl to prevent rearward movement of the reel and a camlike rear edge moving the pawl out of the notch upon forward rotation of the reel, a lever positioned for movement into and out of said notches as the reel rotates in either direction and mounted for pivotal movement by the edges of the notches from a first position to a second position, and a toggle connection between said lever and said pawl for snapping said pawl from a position to engage the forward edge of a notch in the ring to a second position in which it is held against movement into the notches, said toggle connection including a spring operable in one position of the pawl and lever for urging both said lever and said pawl into the notches and operable in the other position of said pawl and lever for maintaining said pawl against movement into the notches and urging said lever into said notches.

8. In a cable reel, a shaft adapted to be positioned at a vertical angle, a cable receiving drum journaled on said shaft for rotation about the axis thereof, spring means operatively connected to said drum and shaft for permitting rotation of the drum in a forward direction upon extension of the cable and urging said drum in a rearward direction of rotation to retract the cable, pawl and ratchet members operatively connected to said drum and said shaft for permitting rotation of the drum in the forward direction and preventing rotation in the rearward direction except to a limited angular extent, and pawl adjusting mechanism engageable with one of said members for actuation thereby and operable upon rotation of said drum in a forward direction to maintain said pawl in position to engage the ratchet upon release of the cable and operable upon engagement with said one member during rotation of the drum in the rearward direction to maintain said pawl in a position out of engagement with the ratchet, until the drum is subsequently rotated in the forward direction, whereby to permit the retraction of the cable without interference by the pawl and ratchet means.

9. In an electric cable reel, means yielding and automatically retracting the electric cable, means for automatically latching the cable against retraction by said first means, means controlled by manipulation of the cable for rendering said latching means ineffective to prevent automatic retraction of the cable, and means for maintaining said latching means ineffective in the event that the cable controlled means becomes inoperative.

10. In a reel, means for permitting movement of the reel in one direction and preventing movement of the reel in the opposite direction, means operated by the reel for rendering said first means ineffective, to prevent movement of the reel in said opposite direction, and means for maintaining the first means ineffective to prevent movement of the reel in said opposite direction in the event the reel operated means becomes inoperative.

11. In a reel, means for limiting the winding movement of the reel and permitting unwinding movement of the reel without such limitation, means operated by the reel upon winding movement for rendering said first means ineffective to limit the winding movement of the reel and operated by the reel upon subsequent unwinding movement for rendering said first means effective to limit the winding movement of the reel, and means for maintaining said first means ineffective to limit the winding movement of the reel in the event the reel operated means becomes inoperative.

12. In a reel, a ratchet member rotatable with the reel, a pawl positioned to engage said ratchet for limiting winding movement of the reel and permitting unwinding movement of the reel, and toggle means for adjusting said pawl for rendering it effective or ineffective to limit winding of the reel, said toggle means comprising a two-position operating member, a spring connector in the first position of the operating member urging said pawl into engagement with the ratchet and in the second position of said operating member maintaining said pawl out of engagement with said ratchet, said operating member being positioned to be engaged and moved by said ratchet to the second position upon winding movement of the reel and to be engaged and moved by said ratchet to the first position upon unwinding movement of the reel, and spring means constantly urging said pawl out of engagement with the ratchet to maintain said pawl disengaged from the ratchet in the event said toggle means becomes inoperative to move the pawl out of engagement with the ratchet.

13. In a cable reel, a stationary shaft, a drum rotatable on said shaft, a cable wound upon said drum, means operatively connected to said drum and shaft for permitting rotation of the drum in a forward direction to extend the cable when a pull is exerted thereon and tending to rotate said drum in a rearward direction, to retract the cable when the pull on the cable is released, a ring secured to said drum for rotation therewith, a disk mounted within said ring and secured to said shaft against rotation with the drum, a pawl pivoted on said disk, said ring having teeth for engagement by said pawl to prevent rotation of the drum in the rearward direction and ratcheting past said pawl on rotation of the drum in the forward direction, a lever pivoted to said disk, a toggle connection, including a spring, connecting said lever to said pawl, said spring being constructed and arranged to urge said pawl into position to engage the tooth of the ring when the lever is in a first position and maintaining said pawl out of tooth-engaging position when the lever is in a second position, said lever being constructed and arranged for movement by the teeth of the ring from the first position to the second position and, reversely, in accordance with the direction of rotation of the drum, and a second spring constantly urging said pawl out of tooth-engaging position for maintaining said pawl out of tooth-engaging position in the event the first spring is inoperative to move the pawl to that position.

14. In a cable reel, a shaft adapted to be positioned at a vertical angle, a cable receiving drum journaled on said shaft for rotation about the axis thereof, spring means operatively connected to said drum and shaft for permitting rotation of the drum in a forward direction upon extension of the cable and urging said drum in a rearward direction of rotation to retract the cable, pawl and ratchet means operatively connected to said drum and said shaft for permitting rotation of the drum in the forward direction and preventing rotation in the rearward direction except to a limited angular extent, pawl adjusting mechanism actuated by said pawl and ratchet means and operable upon rotation of said drum in a forward direction to maintain said pawl in position to engage the ratchet upon release of the cable and operable upon rotation of the drum during its permitted angular movement in the rearward direction to maintain said pawl in a position out of engagement with the ratchet, until the drum is subsequently rotated in the forward direction, whereby to permit the retraction of the cable without interference by the pawl and ratchet means, and means for maintaining said pawl in a position out of engagement with the ratchet in the event the pawl adjusting mechanism becomes inoperative to move the pawl to such position.

HENRY R. GROSS.